United States Patent [19]
Miki et al.

[11] Patent Number: 5,947,155
[45] Date of Patent: Sep. 7, 1999

[54] LINEAR SOLENOID VALVE

[75] Inventors: Nobuaki Miki; Haruki Yamamoto, both of Anjo, Japan

[73] Assignee: Aisin Aw Co., Ltd., Japan

[21] Appl. No.: 08/988,952

[22] Filed: Dec. 11, 1997

[30] Foreign Application Priority Data

Dec. 28, 1996 [JP] Japan ................................... 8-358143

[51] Int. Cl.⁶ .............................................. F15B 13/044
[52] U.S. Cl. .................... 137/625.65; 251/129.1; 335/229; 335/256
[58] Field of Search .................. 137/625.65; 251/129.1; 335/229, 256

[56] References Cited

U.S. PATENT DOCUMENTS

| | | | |
|---|---|---|---|
| 4,071,042 | 1/1978 | Lombard et al. | 335/266 X |
| 4,316,599 | 2/1982 | Bouvet et al. | 137/625.65 X |
| 4,579,145 | 4/1986 | Leiber et al. | 137/625.65 |
| 4,838,517 | 6/1989 | Miki et al. | 137/625.65 X |
| 5,259,414 | 11/1993 | Suzuki | 137/625.65 |

FOREIGN PATENT DOCUMENTS 4-272587  9/1992  Japan ................................. 137/625.65

*Primary Examiner*—Gerald A. Michalsky
*Attorney, Agent, or Firm*—Lorusso & Loud

[57] ABSTRACT

A linear solenoid valve is composed of a pressure regulating section and an actuator section. In the pressure regulating section, a valve spool is slidably disposed and is biased in one direction by a single elastic member. The actuator section generates a thrust force and transmits that generated thrust force in an opposite direction to the pressure regulating section via a shaft. The actuator section is a movable magnet type linear actuator which includes three serially disposed coils and two permanent magnets disposed within the coils with like poles of the permanent magnets facing each other. The linear solenoid valve generates a stable control pressure which is large in proportion to input current, while generation of hysteresis and of radial load in the actuator section is avoided and responsiveness is improved.

19 Claims, 7 Drawing Sheets

LINEAR SOLENOID VALVE

BACKGROUND OF THE INVENTION

1. Field of the Invention

The present invention relates to a linear solenoid valve which includes a pressure controlling section, including a slidable valve spool biased in one direction by at least one elastic member, and an actuating section which generates a thrust force which is transmitted to the valve spool.

2. Description of the Related Art

A conventional linear solenoid valve, as shown in FIG. 6, includes a casing K of a magnetic material, a plunger (movable core) P, and a core (stationary core) F within the hollow interior portion (center space) of a core assembly C, which components form the magnetic circuit of electromagnet section M. When current is supplied to the coil C, magnetic flux is generated in the magnetic circuit, and an electromagnetic attraction force is generated between the plunger P and the core F which acts on spool valve SV of the pressure control section S which is thereby moved relative to sleeve SL to control the pressure of a fluid.

In the conventional linear solenoid valve, since a magnetic material is used for the casing K, the plunger P, and the core F, which form the magnetic circuit of the electromagnet section M, there exists a magnetic hysteresis peculiar to the magnetic material, as shown in FIG. 7. Therefore, even when the current is constant, the control pressure varies depending on the direction of movement of the spool valve, resulting in unstable operation.

Also, the amount of magnetic flux that can pass through each member made of the magnetic material is limited due to magnetic saturation and depends on the cross-sectional area of the member. Therefore, even when the current is greatly increased, the electromagnetic attraction force increases only to a limited extent, so that a large control pressure cannot be obtained.

Further, since the electromagnetic attraction force is generated in a direction along the flow of the magnetic flux, as shown in FIG. 8, a radial component of force acts on bearings B as a radial load. Therefore, the bearings B must have high accuracy, and the structure thereof becomes complicated.

Also, since sliding resistance proportional to the friction coefficient of the bearings B exists between the shaft ST and the bearings B, the above-described hysteresis increases, and the responsiveness of the control pressure to the current suffers.

Moreover, since the electromagnetic attraction force is greatly affected by the air gap between the components, the components of the electromagnet section M must be manufactured with a high degree of precision, resulting in an increase in cost.

SUMMARY OF THE PRESENT INVENTION

An object of the present invention is to provide a linear solenoid valve (LSV) which prevents generation of hysteresis and radial load in the actuator section of the LSV.

Another object of the present invention is to provide a LSV which produces a large, stable control pressure in proportion to input current, i.e. an LSV with enhanced responsiveness.

To achieve the above objects, the present invention provides a linear solenoid valve (LSV) which includes a pressure control section, in which a valve spool is slidably mounted and is biased by at least one elastic member, and an actuator section which generates a thrust force transmitted to the valve spool via a shaft, wherein the actuator section is a movable magnet type linear actuator comprising a coil assembly and a magnet member disposed within the coil assembly and mounted on the shaft.

In the LSV having the above-described structure, when current is applied to the coil assembly of the actuator section, a thrust force acts on the coil assembly in accordance with Fleming's left-hand rule. However, since the coil assembly is fixed, the reaction force responsive to the thrust force acts on the magnet member disposed within the coil assembly and attached to the shaft and is transmitted to the valve spool of the pressure control section. As a result, the valve is moved, against the biasing force of the elastic member, in order to control the pressure. Therefore, a large control pressure in proportion to input current can be stably produced, and responsiveness can be improved, while generation of hysteresis and radial load in the actuator section is avoided.

Preferably, the above-described coil assembly is composed of at least three coils serially disposed along the central, longitudinal axis of the actuator section. The magnet member fixed to the shaft is preferably composed of at least two permanent magnets which are disposed with their like poles facing each other. Arranged in this manner the flux of the permanent magnets will flow radially in one direction on one side of an inter-pole boundary within each permanent magnet and radially in the opposite direction on the other side of the inter-pole boundary, as illustrated in FIGS. 1, 4 and 5 which show the flux of the permanent magnets as loops with arrows. Thus, the radial magnetic forces offset so that the shaft carrying the permanent magnets is not canted and frictional sliding resistance is minimized. In this preferred embodiment, the component of magnetic flux in a direction perpendicular to the longitudinal axis of the actuator section (radial component) can be increased without increasing frictional resistance to sliding, and therefore, a larger axial thrust force can be obtained.

Preferably, a yoke is disposed between the above-described permanent magnets, and another yoke is disposed to surround the coils. In this manner, the component of magnetic flux in a direction perpendicular to the magnetization direction of the permanent magnets can be increased, and therefore, a larger axial thrust force can be obtained.

Preferably, the opposing ends of the above-described opposing permanent magnets are engaged with the shaft via side yokes made of a magnetic material. In this preferred construction, the component of magnetic flux in a direction perpendicular to the magnetization direction of the permanent magnets is further increased, and therefore, a larger axial thrust force is obtained. In addition, the axial movement of the shaft can be restricted.

Preferably, the above-described yoke disposed surrounding the coils supports the shaft for relative movement therebetween via bearings and side plates made of a material selected in accordance with the type of the linear solenoid valve. Therefore, the linear solenoid valve can provide a push-pull type operation, a bistable type operation, or an automatic return type operation.

Preferably, the spring constant of the above-mentioned one elastic member is set such that when no current is supplied to the coils of the actuator section, the control pressure is approximately in the center of the pressure control range. In this case, the thrust force can be generated in either direction depending on the direction of the current flowing through the actuator section, and the pressure control range of the linear solenoid valve can be increased using only a low current, so that generation of heat within the actuator section is minimized.

In another preferred embodiment the above-mentioned elastic member is located adjacent the actuator section and elastically supports one end of the shaft while allowing the axial movement thereof. Therefore, a bearing at that location can be omitted, resulting in a reduction in the number of parts and cost.

Further, if one end of the shaft is fixed to one end of the valve spool, which valve spool has its central axis precisely positioned by the valve sleeve, need for a bearing at that one end of the shaft is eliminated resulting in a reduction in the number of parts and cost.

Moreover, the shaft may be formed integrally with the valve spool for movement in tandem therewith, in which case the above-mentioned elastic member can be a single member for biasing the valve spool. The number of parts is thereby minimized, the structure is further simplified and the cost is further reduced.

Moreover, no radial load is generated within the movable magnet type linear actuator. Even when the shaft and the valve spool are integrally formed as a single member, the responsiveness of control pressure to thrust force is greatly improved, because of lack of a radial load, which would otherwise increase the sliding resistance as in the conventional linear actuators.

DESCRIPTION OF THE PREFERRED EMBODIMENTS

Embodiments of the present invention will next be described in detail with reference to the accompanying drawings.

FIRST EMBODIMENT

Figure 1:
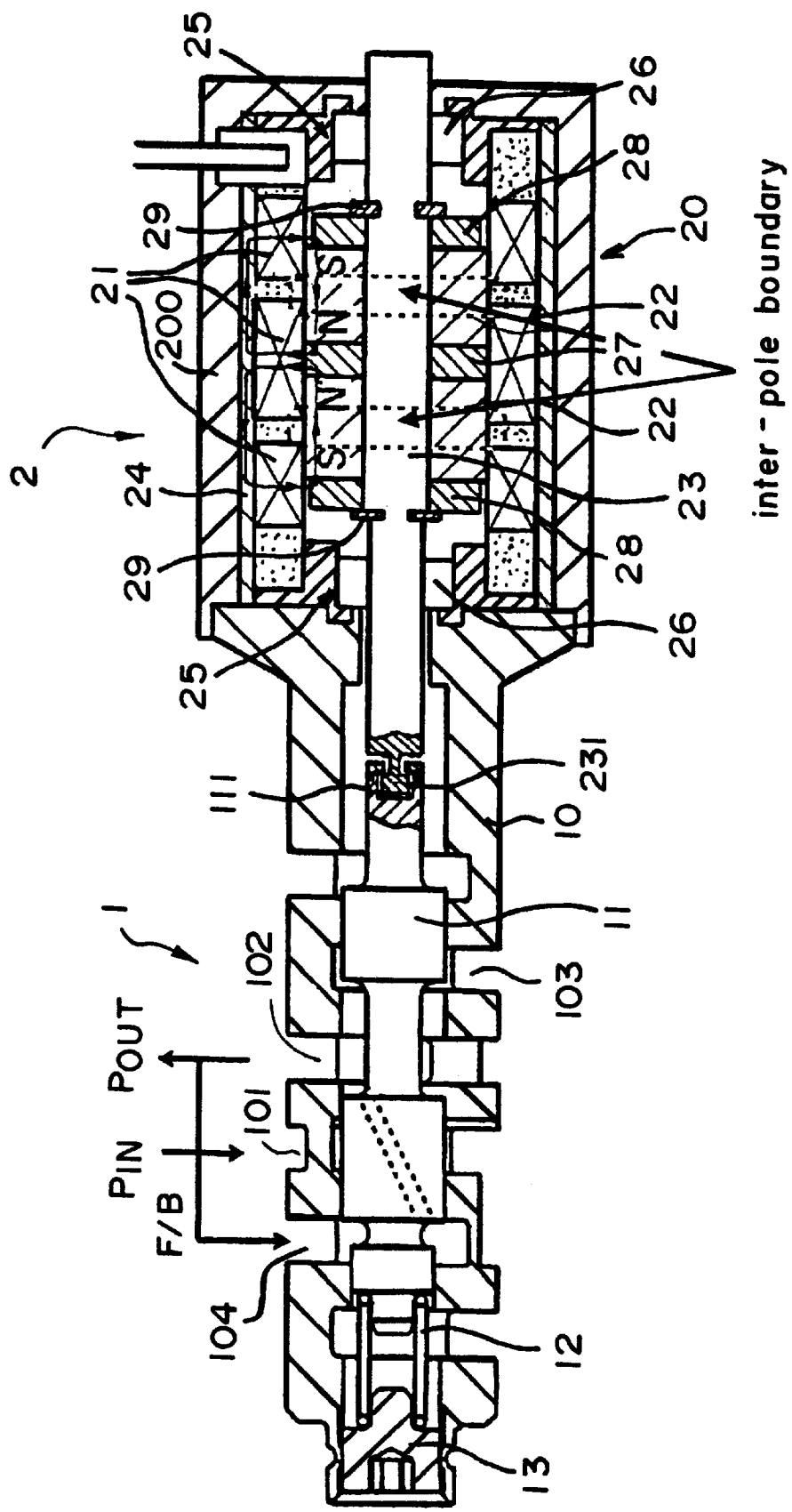
FIG. 1 is a sectional view of a linear solenoid valve according to a first embodiment of the present invention.

As shown in FIG. 1, a linear solenoid valve according to a first embodiment of the present invention is composed of a pressure regulating section 1 and an actuating (thrust-force generating) section 2. In the pressure regulating section 1, a valve spool 11 is slidably disposed in a valve sleeve 10 and is biased to the right in the drawing by single elastic member 12. The actuating section 2 generates a thrust force which is transmitted to the pressure-adjusting section via a shaft 23. The actuating section 2 is a movable magnet type linear actuator 20 which includes three serially disposed coils 21 and two permanent magnets 22 disposed within the coils 21 such that like poles of the permanent magnets 22 face each other.

As shown in FIG. 1, the spool valve which constitutes the pressure regulating section 1 is composed of a valve sleeve 10, a spool 11, a plug 13, and an elastic member in the form of spring 12. The valve sleeve 10 is provided with an inlet port 101 for receiving fluid at a supply pressure, an outlet port 102 for supplying fluid at the regulated pressure, a drain port 103 for draining the pressurized fluid, and a feedback port 104 for establishing feedback of the output pressure. The spool 11 is slidably disposed within the valve sleeve 10, and the plug 13 is fixed to and closes one end of the valve sleeve 10. The spring 12 is interposed between the plug 13 and the spool 11 in order to urge the spool 11 to the right in FIG. 1.

In accordance with the balance among the thrust force generated by the actuator section 2, the biasing force of the spring 12, and the force of the output-pressure feedback, the input pressure of the fluid is increased or reduced to output a regulated pressure, the thrust force and, consequently, the balance of forces and the regulated pressure, changing responsive to an electrical signal input to actuating section 2.

As shown in FIG. 1, the actuating section 2 includes, a hollow cylindrical yoke 24 which is inserted into a cover 200 made of a nonmagnetic material. The three annular coils 21 are supported by the inner circumferential wall of the yoke 24 such that the coils 21 are axially arranged in series.

A ring-shaped slide plate 25 is disposed at each end of the yoke 24. Bearings 26 are supported by the inner circumferential walls of the respective slide plates 25 in order to support the shaft 23 at opposite ends thereof for axial sliding.

As shown in FIG. 1, the two annular permanent magnets 22 are disposed on the shaft 23, with a center yoke 27 serving as an intermediate magnetic material being interposed therebetween, and with like poles of the permanent magnets 22 facing each other. A side yoke 28 made of a magnetic material is disposed at each of opposing ends of the two permanent magnets 22 and is axially fixed on the shaft 23 via an E-ring 29.

The three annular coils 21, axially arranged in series on the inner circumferential wall of the yoke 24, are connected to a controller (not shown) so that current flows in one direction on one side of an inter-pole boundary within a permanent magnet 22 and flows in the opposite direction on the other side of the inter-pole boundary to produce fluxes indicated by the arrows in FIG. 1. Consequently, the radial forces offset rather than radially biasing or canting the shaft and magnets of the actuators as in the prior art.

Side plates 25, made of a material dictated by the type of the linear solenoid valve, are disposed at the opposing ends of the magnetic material yoke 24 surrounding the coils 21 and supporting the shaft 23 via the bearings 26 for sliding movement relative thereto.

Specifically, when the linear solenoid valve is of a push-pull type, the side plates 25 are formed of BS (black sheet) plate; when the linear solenoid valve is of a bistable type, the side plates 25 are formed of iron plate; and when the linear solenoid valve is of an automatic return type, the side plates 25 are formed as a combination of BS plate and iron plate.

A projection 231, which is provided at the left end of the shaft 23 in FIG. 1, is detachably engaged with a concave fitting 111 formed at the right end of the spool 11, so that movement of the shaft 23 and movement of the spool 11 are mechanically interlocked. In addition, since the elastic biasing means can be the single spring 12, which applies a biasing force to the left end of the spool 11, the number of parts can be minimized, and the structure can be simplified to reduce the cost.

Figure 2:
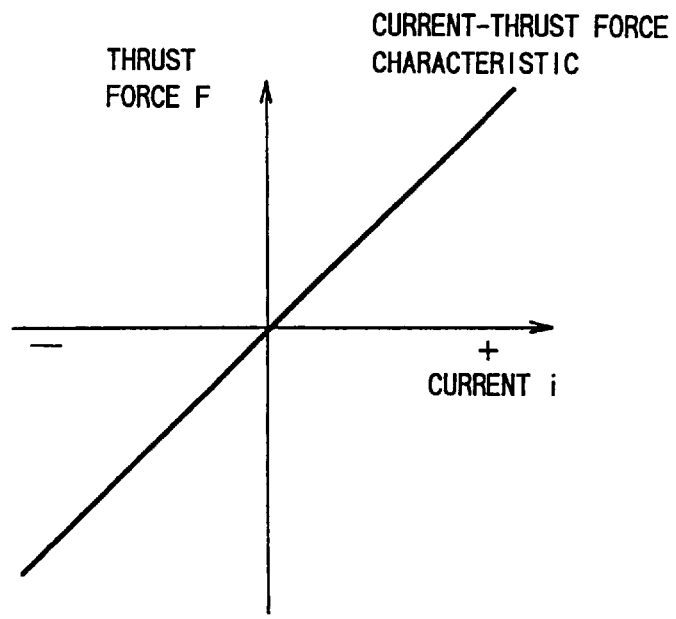
FIG. 2 is a graph of the control current i verses thrust force F in operation of the first embodiment.
Figure 3:
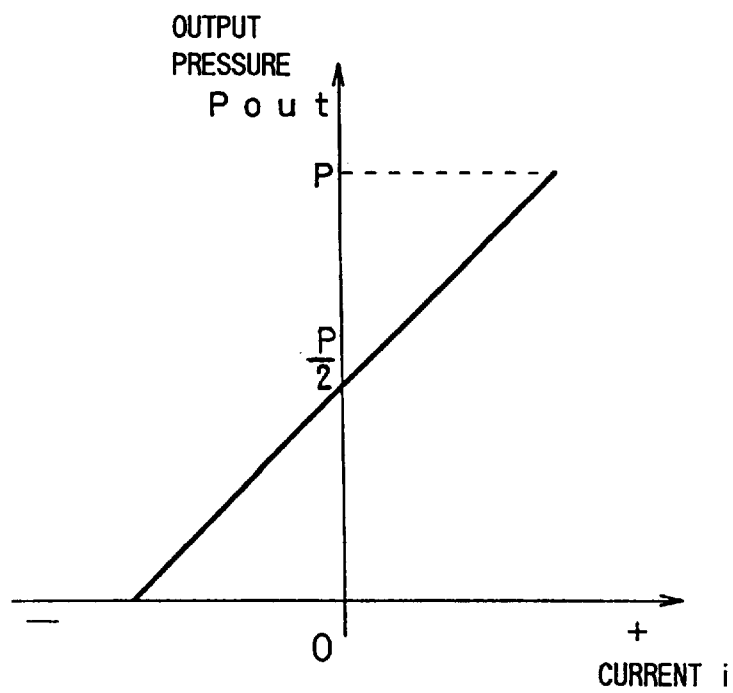
FIG. 3 is a graph of the control current i versus output pressure $P_{OUT}$ in operation of the first embodiment.

As shown in FIGS. 2 and 3, the spring constant of the spring 12, which serves as the above-described elastic member for urging the spool 11 rightward, is set such that when no current is supplied to the coils 21 of the actuating section 2, the control pressure becomes a value in the center of the pressure control range as shown in FIGS. 2 and 3. Therefore, a thrust force can be generated in either direction depending on the direction of the current flowing through the actuator section 2, and the pressure adjusting range of the linear solenoid can be increased with low current, so that generation of heat within the actuator section 2 can be minimized.

In the linear solenoid valve according to the first embodiment having the above-described structure, when current is supplied to the coils 21 of the movable magnet type linear actuator 20, a thrust force acts on the coils 21 in accordance with Fleming's left-hand rule. However, since the coils 21 are fixed to the cover 200 via the yoke 24, a reaction force in response to the thrust force acts on the permanent magnets 22. As a result, the spool 11 is moved against the biasing force of the spring 12 in order to control the pressure. Therefore, a large control pressure in proportion to input current can be stably produced, while generation of hysteresis or radial load in the actuator section 1 is prevented.

Given the arrangement of two permanent magnets 22 of the linear actuator 20 located within the three coils 21, flux flows radially in one direction on one side of an inter-pole boundary within each permanent magnet 22 and flux flows radially in the opposite direction on the other side of the inter-pole boundary. Therefore, the component of magnetic flux in a direction perpendicular to the axis of the linear actuator 20 can be increased with consequent increase in the axial thrust force.

Also, in the linear solenoid valve according to the first embodiment, since major components (the coils 21 and the permanent magnets 22) that generate a thrust force axially of the linear actuator 20 include no magnetic material, magnetic hysteresis peculiar to magnetic materials is not generated. Therefore, no variations occur in the fluid pressure when the current is maintained constant, so that precise pressure control is enabled.

On the other hand, if a magnetic material were to be used, the number of lines of magnetic force would be limited in dependence on the cross-sectional area of the magnetic material, and thus magnetic saturation would result. However, in the present invention, since the linear actuator 20 includes no magnetic material, the thrust force can be increased to maximize and the pressure control range can be widened.

In the linear solenoid valve according to the first embodiment, since the center yoke 27 serving as the intermediate magnetic material is disposed between the opposing permanent magnets 22 and the magnetic material yoke 24 is disposed surrounding the coils 21, the component of magnetic flux in a direction perpendicular to the magnetization direction of the permanent magnets 22 can be increased, a larger axial thrust force can be obtained.

Moreover, because the opposite ends of the opposing permanent magnets 22 abut the E-rings 29 engaging the shaft 23 via the side yokes 28 are made of a magnetic material, the component of magnetic flux in a direction perpendicular to the magnetization direction of the permanent magnets 22 can be further increased, and therefore, a yet larger axial thrust force can be obtained. In addition, the axial movement of the shaft can be restricted.

In the linear solenoid valve according to the first embodiment, since no radial load is imposed on the shaft and permanent magnets, unlike the case in conventional linear solenoid valves, the responsiveness of control pressure to change in thrust force can be improved greatly. Further, since no radial load is produced, the bearings 26, which otherwise would require machining with high accuracy, may be machined with relatively low accuracy. In addition, the structure of the solenoid valve can be simplified.

SECOND EMBODIMENT

Figure 4:
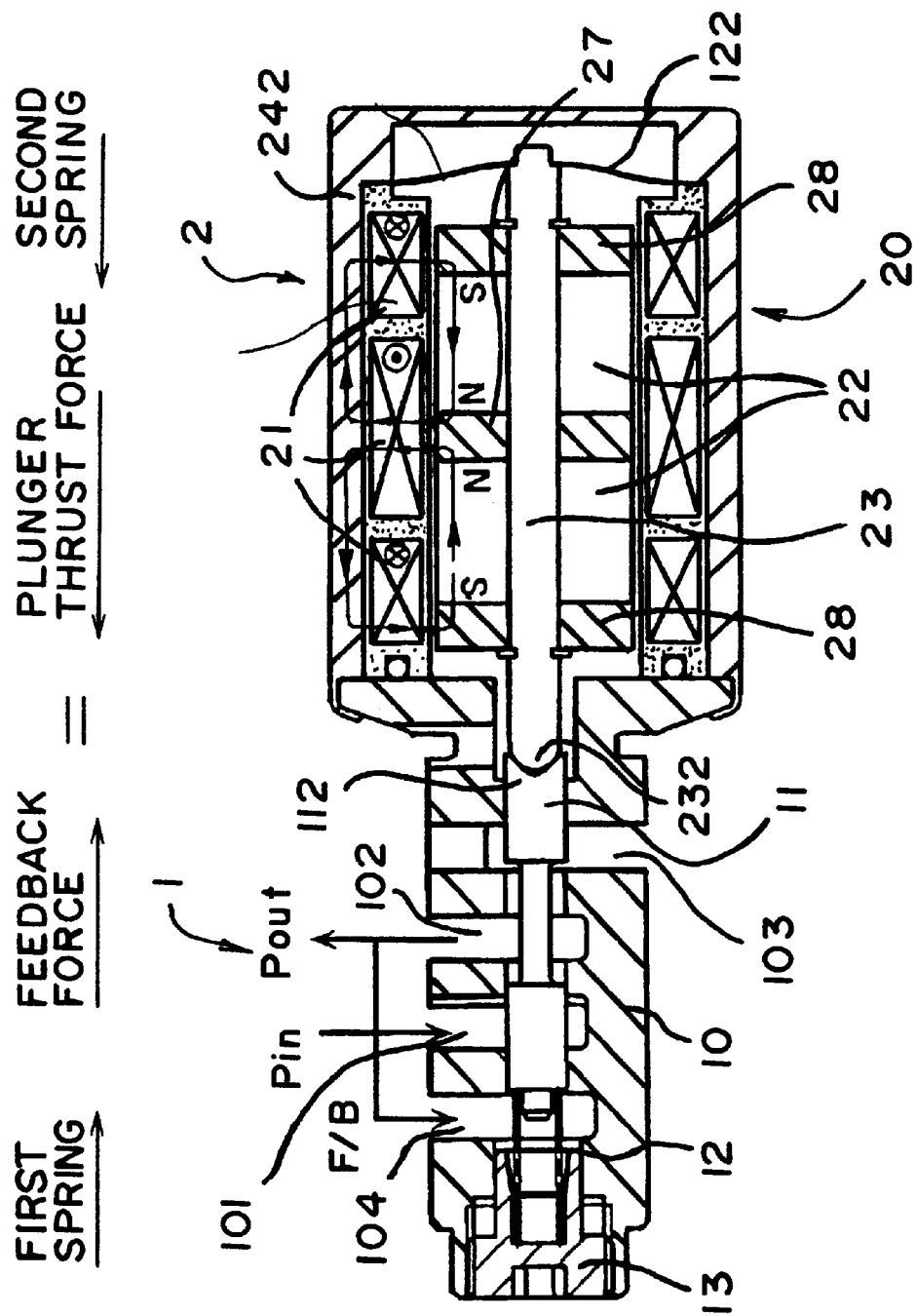
FIG. 4 is a sectional view of a linear solenoid valve according to a second embodiment of the present invention.

As shown in FIG. 4, a linear solenoid valve according to a second embodiment of the present invention differs from that of the first embodiment in that a semi-spherical convex fitting 232, provided at the left end of the shaft 23, is engaged with a semi-spherical concave fitting 112 provided at the right end of the spool 11, which is slidably disposed within the pressure control section 1. Features identical to the first embodiment are denoted by like symbols, and the description thereof will be omitted. Note that the flow of magnetic flux, as indicated by the arrows in FIG. 9, is the same as indicated by the arrows in FIG. 1.

In the second embodiment the elastic biasing means is a leaf spring 122 having a dish-like shape. The leaf spring 122 is engaged with the right end of a hollow cylindrical casing 242 which has a thick wall and a bottom and which constitutes the outer yoke of the actuator section 2. The leaf spring 122 elastically and coaxially supports the right end of the shaft 23.

In the linear solenoid valve according to the second embodiment, the elastic member is engaged with the right end of the actuator section 2 in order to elastically support the right end of the shaft 23 for axial sliding movement. Therefore, the bearing 26, which is disposed at one end of the shaft 23 in the first embodiment, can be omitted, resulting in a reduction in the number of parts and cost.

In the linear solenoid valve according to the second embodiment, the semi-spherical convex fitting 232 provided at the left end of the shaft 23 is engaged with the semi-spherical concave fitting 112 provided at the right end of the spool 11, which is slidably disposed within the pressure-adjusting-valve section 1. Since the other end of the shaft 23 can be supported through utilization of the spool 11, whose center axis is precisely positioned by the valve sleeve 10, the bearing 26 which is disposed at the other end of the shaft 23 in the first embodiment and which requires precise machining can be omitted, resulting in a reduction in the number of parts and cost.

In the linear solenoid valve according to the second embodiment, since no radial load is produced, unlike the case in conventional linear solenoid valves, the responsiveness of control pressure to thrust force can be greatly improved.

THIRD EMBODIMENT

Figure 5:
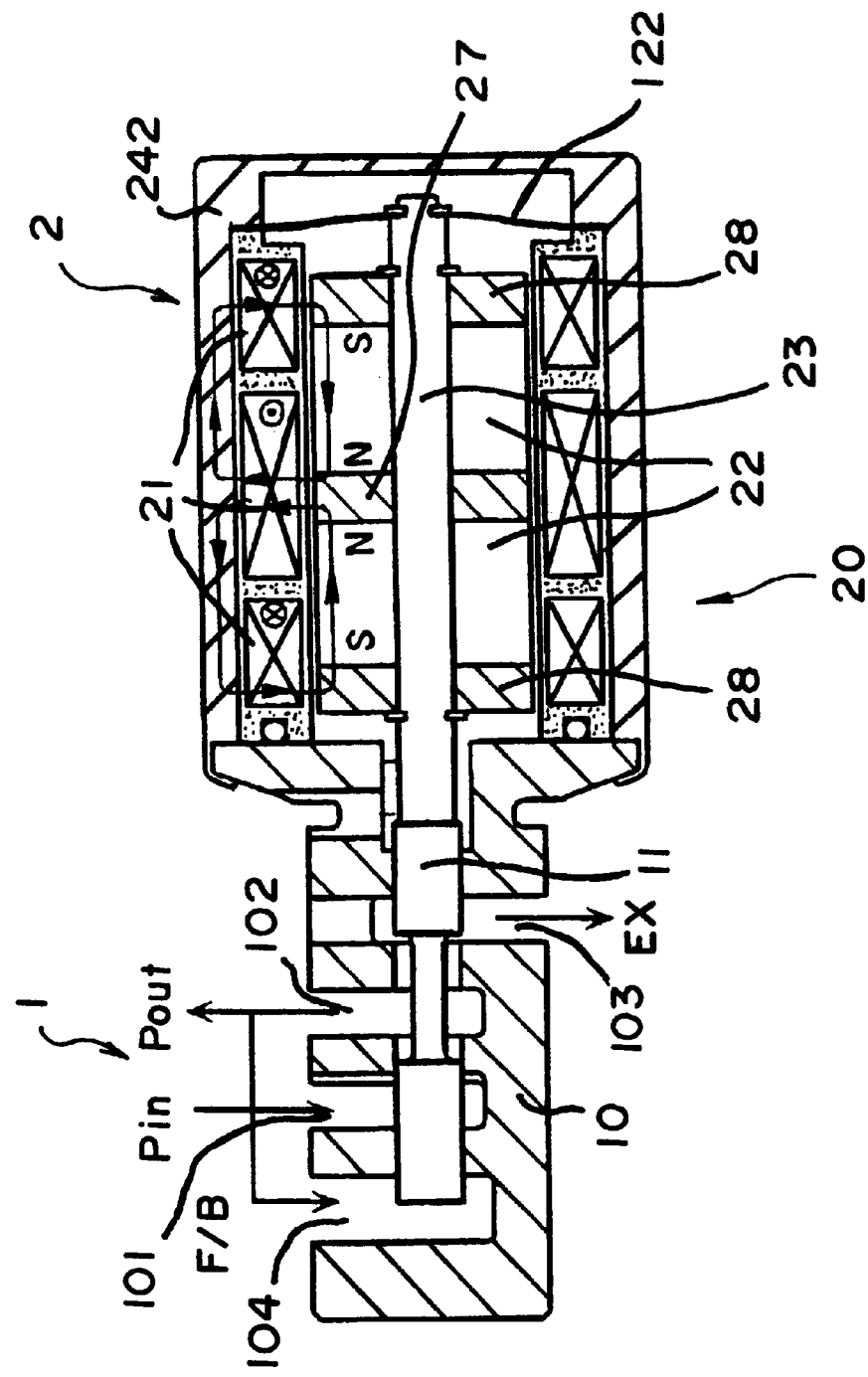
FIG. 5 is a sectional view of a linear solenoid valve according to a third embodiment of the present invention.
Figure 6:
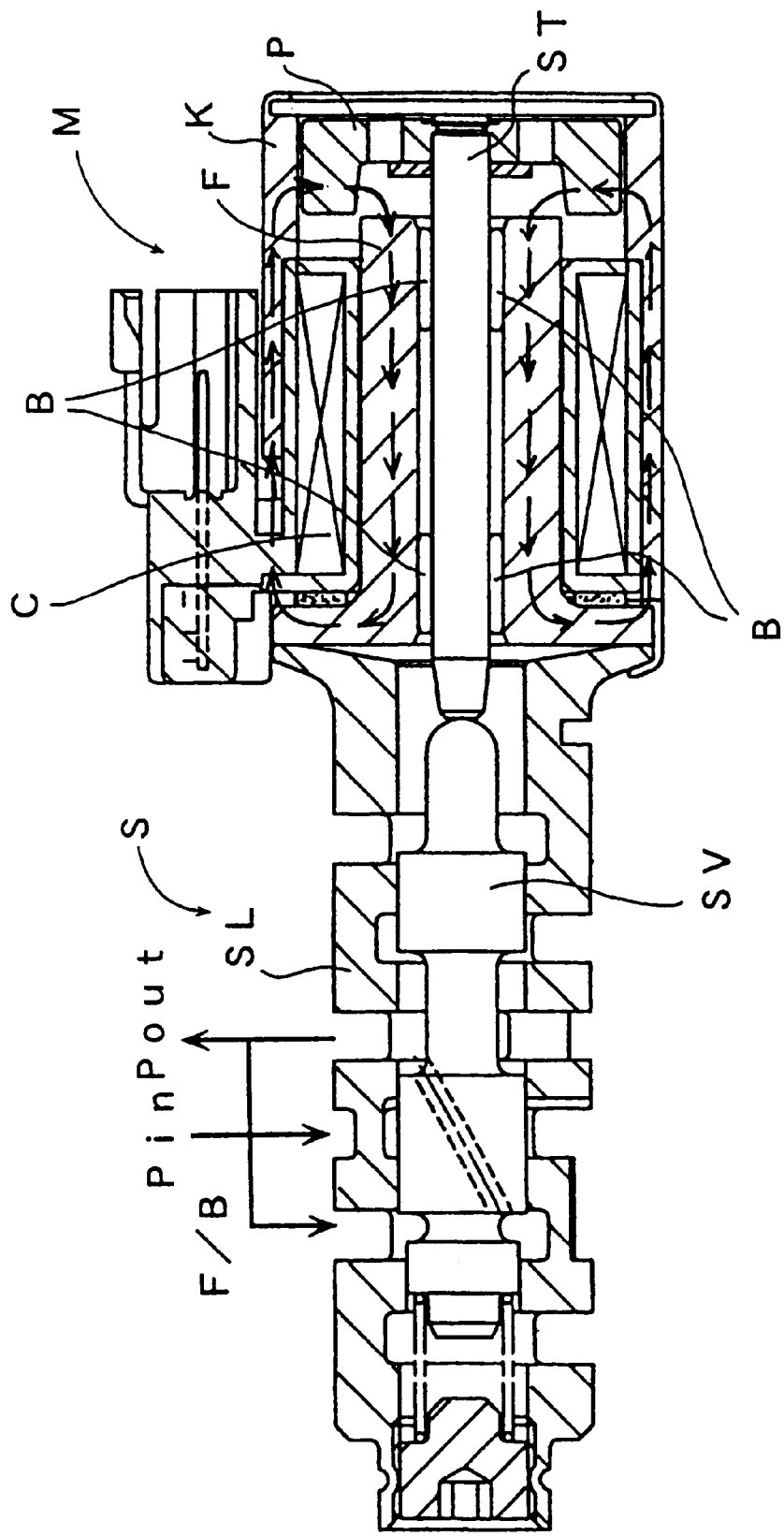
FIG. 6 is a sectional view of a conventional linear solenoid valve.
Figure 7:
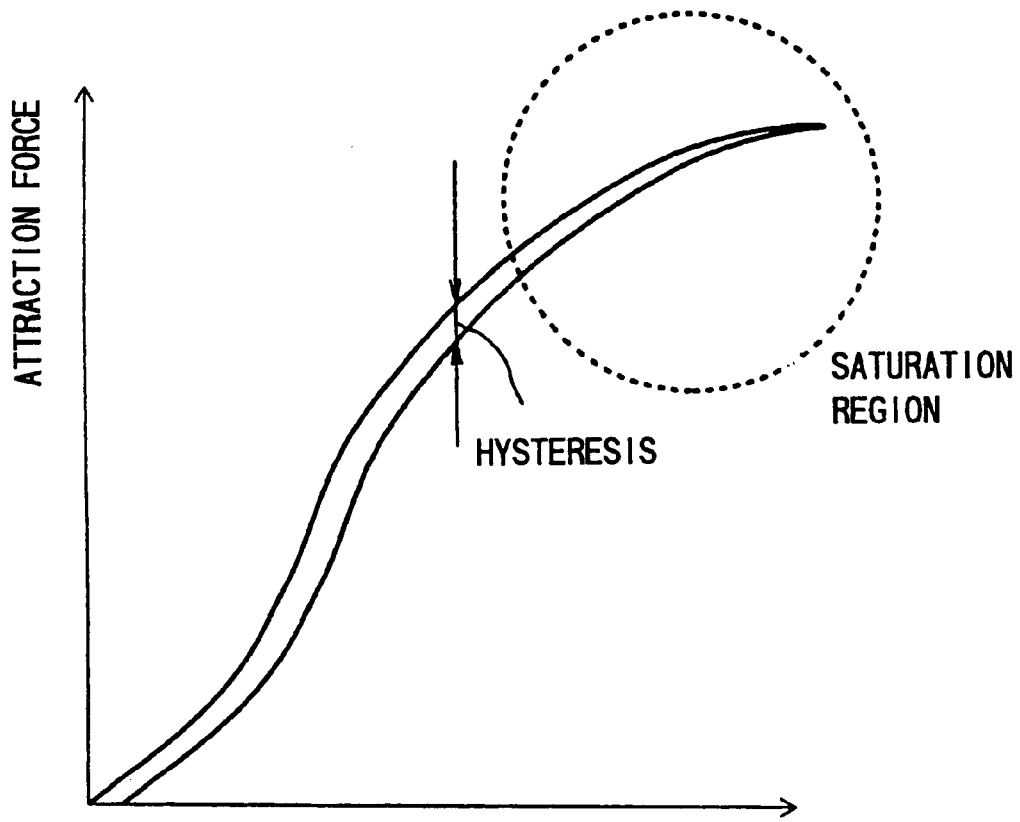
FIG. 7 is a graph showing the hysteresis characteristic of the conventional linear solenoid valve.
Figure 8:
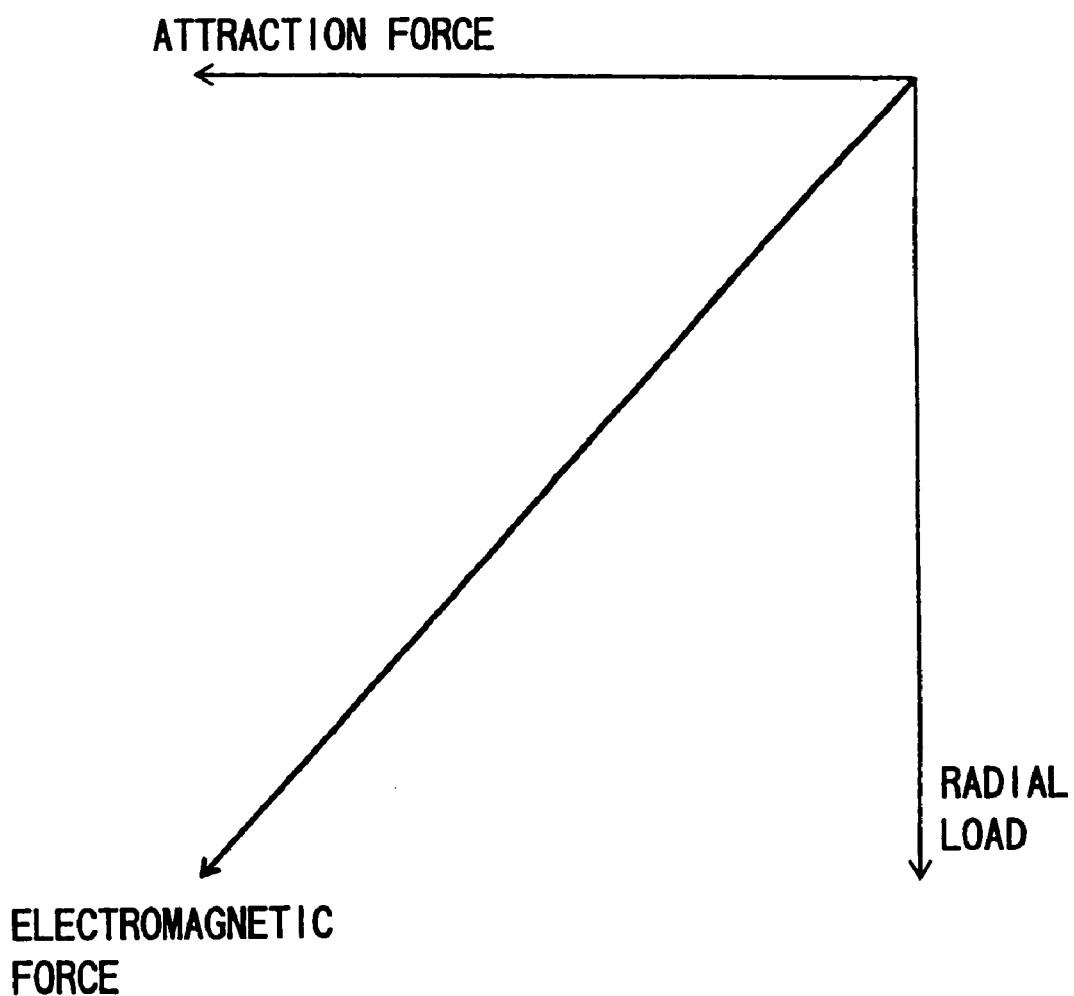
FIG. 8 is a diagram showing the relationship among attraction force, electromagnetic force, and radial load in the conventional linear solenoid valve.

As shown in FIG. 5, a linear solenoid valve according to a third embodiment of the present invention differs from the linear solenoid valve according to the second embodiment in that the shaft 23 is formed integrally with the spool 11, which is slidably disposed within the pressure regulating section 1. Again, features identical to those of the previously described embodiments are denoted by like symbols, and the description thereof is omitted. Again, note that the flow of magnetic flux indicated by the arrows in FIG. 5 is the same as indicated by the arrows in FIG. 1.

In the linear solenoid valve according to the third embodiment, since the shaft 23 is formed integrally with the spool 11, integral movement of the shaft 23 and the spool 11 is achieved and the elastic biasing means can be the single leaf spring 122 which is fixed to and biases the shaft 23. Therefore, the number of parts can be minimized, and the structure can be simplified to reduce cost.

In the linear solenoid valve according to the third embodiment, even when the shaft 23 and the spool 23 are integrally formed as a single member, the responsiveness of control pressure to thrust force can be greatly improved, because no radial load, which would otherwise increase the frictional resistance to sliding, is transmitted from the shaft 23 to the spool 11, unlike the case of conventional linear actuators.

In the first embodiment, there is described an example in which a magnetic material is used for the side yokes. However, the present invention is not limited thereto, and may be applied to a structure in which the opposite ends of the opposing permanent magnets are engaged with the shaft via yokes made of a nonmagnetic elastic material. In this modification, the permanent magnets can be elastically supported in order to mitigate repeated impacts of the thrust force on the permanent magnets due to thrust force.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A linear solenoid valve comprising:
    a pressure control section for regulating an input pressure to produce a control pressure, said pressure control section including:
    a valve sleeve;
    a valve spool slidably disposed in said valve sleeve; and
    at least one elastic member mounted within said valve sleeve and biasing said valve spool in a first direction;
    a linear actuator section for generating a thrust force in a second direction, opposite said first direction, said actuator section including:
    a housing fixed to said valve sleeve;
    a shaft slidably mounted in said housing for sliding movement relative to said housing responsive to said thrust force and defining a longitudinal axis;
    a coil assembly around at least a portion of said shaft; and
    at least first and second permanent magnets disposed within said coil assembly and fixed to said shaft for movement therewith said first and second permanent magnets being arranged with like poles facing each other, and wherein magnetic flux flows radially in one direction on one side of an inter-pole boundary within each permanent magnet and flows radially in the opposite direction on the other side of the inter-pole boundary; and
    at least one elastic member biasing said shaft in the second direction.

2. A linear solenoid valve according to claim 1, wherein said coil assembly is composed of at least three coils serially disposed along said axis.

3. A linear solenoid valve according to claim 2, wherein one yoke is disposed between and spaces apart said permanent magnets, and another yoke is disposed surrounding said coils.

4. A linear solenoid valve according to claim 3, wherein opposing ends of said permanent magnets are engaged with said shaft via side yokes made of a magnetic material.

5. A linear solenoid valve according to claim 4, wherein said yoke disposed surrounding said coils supports said shaft for relative movement therebetween via bearings and side plates.

6. A linear solenoid valve according to claim 1, wherein said one elastic member has a spring constant such that, when no current is supplied to said coil assembly of said actuator section, the control pressure is a pressure approximately in the center of a pressure control range.

7. A linear solenoid valve according to claim 6, wherein said one elastic member is mounted within one end of said housing and elastically supports one end of said shaft while allowing the axial movement thereof.

8. A linear solenoid valve according to claim 7, wherein said one elastic member is a leaf spring.

9. A linear solenoid valve according to claim 7, wherein the other end of said shaft, opposite said one end, is engaged with one end of said valve spool.

10. A linear solenoid valve according to claim 9, wherein a semi-spherical convex fitting is formed at said other end of said shaft, and a semi-spherical concave fitting, mated with said convex fitting, is formed at said one end of said valve spool.

11. A linear solenoid valve according to claim 10, wherein said one elastic member is a leaf spring.

12. A linear solenoid valve according to claim 7, wherein said shaft is formed integrally with said valve spool.

13. A linear solenoid valve according to claim 12 wherein said two permanent magnets are arranged with like poles facing each other and are axially spaced by a yoke with said like poles abutting said yoke.

14. A linear solenoid valve according to claim 1 further comprising a yoke disposed between and spacing apart said first and second permanent magnets.

15. A linear solenoid valve comprising:
    a valve sleeve;
    a pressure control section for regulating an input pressure to produce a control pressure within a pressure control range, said pressure control section including:
    a valve sleeve;
    a valve spool slidably disposed in said valve sleeve; and
    at least one elastic member biasing said
    valve spool in a first direction; and
    a thrust-force generating section for generating a thrust force on a shaft and for transmitting the thrust force to said valve spool through said shaft, said thrust-force generating section comprising:
    three serially disposed coils arranged around said shaft;
    two permanent magnets disposed within said coils and mounted on said shaft with like poles facing each other;
    an intermediate yoke disposed between said facing poles of said permanent magnets;
    side yokes disposed abutting opposing ends of said permanent magnets and fixing said permanent magnets axially with respect to said shaft; and an outer yoke disposed around said coils, said permanent magnets producing two loops of flux flow, each loop of flux flow having a radial component in one direction on one side of an inter-pole boundary within each permanent magnet and a radial component in the opposite direction on the other side of the inter-pole boundary.

16. A linear solenoid valve according to claim 15, wherein said one elastic member has a spring constant such that, when no current is supplied to said coils of said thrust-force generating section, the control pressure is approximately centered within the pressure control range.

17. A linear solenoid valve according to claim 15, wherein said elastic member is engaged with one end of said thrust-force generating section and elastically supports one end of said shaft while allowing axial movement thereof.

18. A linear solenoid valve according to claim 15, wherein the other end of said shaft is engaged with one end of said valve spool.

19. A linear solenoid valve according to claim 15, wherein said shaft is formed integrally with said valve spool.

* * * * *